Dec. 13, 1938.  D. I. REITER  2,140,333
CONNECTER FOR HANDLE STRAPS
Filed May 3, 1938
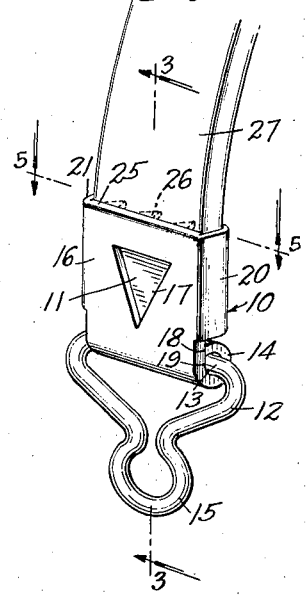
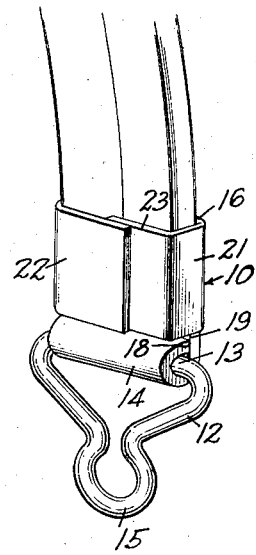
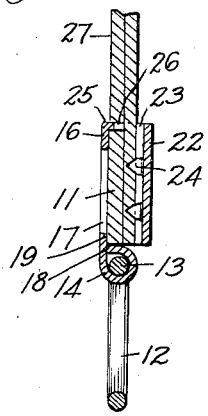
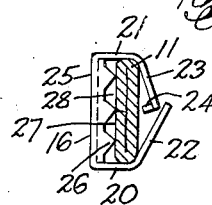
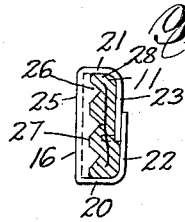
INVENTOR
DANIEL I. REITER
BY
ATTORNEY Patented Dec. 13, 1938

2,140,333

UNITED STATES PATENT OFFICE 2,140,333

CONNECTER FOR HANDLE STRAPS

Daniel I. Reiter, New York, N. Y.

Application May 3, 1938, Serial No. 205,674

2 Claims. (Cl. 24—265)

This invention relates to a connecter for securing the end of a strap handle of a pocketbook or the like in place and relates particularly to fasteners designed to receive the end portion of such strap handle in its flat state without the necessity for looping said end portion about the fastener.

My invention contemplates the provision of a simple one-piece fastener or connecter securing the end portion of the strap handle of a pocketbook or the like to a swivel link or other holding means on the remainder of the pocketbook without permitting said end portion to interfere in any manner with the swiveling action of the parts.

My invention further contemplates the provision of a simple one-piece sheet metal connecter adapted to serve as an ornament for the end portion of a strap handle and further adapted to be readily bent about the end of the strap handle to secure said end adequately thereto, the connecter being also provided with a completely closed loop free and independent of the bendable parts of the connecter and separating the strap end from the part on which the connecter is hinged, whereby the strap handle is maintained in its proper position regardless of the lack of skill of the persons who assemble the parts.

The various objects of the invention will be clear from the description which follows and from the drawing, in which, Fig. 1 is a perspective view of my invention as it appears assembled with the end part of a strap handle.

Fig. 2 is a similar view of the same, showing the inner or rear side of the strap and fastener.

Fig. 3 is a vertical section taken on the line 3—3 of Fig. 1.

Fig. 4 is an end view of the fastener as it appears after the strap end has been inserted thereinto and before the bendable parts thereof have been bent into their final strap-securing positions.

Fig. 5 is a horizontal section taken on the line 5—5 of Fig. 1.

In the practical embodiment of my invention which I have shown by way of example, my improved fastener or connecter 10 is employed for securing the end portion 11 of a strap handle or the like hingedly to a swivel link or other securing means as 12. The link 12 is provided with a bar as 13 passing through the loop 14 of the fastener and is also provided with a suitable eye as 15 adapted to pass through a suitable stationary member on the bag to movably connect the handle and the bag.

As has been indicated, the fastener 10 is made of a single piece of sheet metal, being provided with a front wall 16 designed to receive ornamentation and preferably provided with an opening 17 of any suitable shape so that the end portion of the strap handle is visible therethrough. The loop 14 forms a terminal extension of the wall 16, said loop being completely closed so that the marginal edge 18 thereof engages the inner or rear surface 19 of the wall 16.

It will be seen that by the formation of the completely closed and transversely extending loop 14, the cross bar 13 is protected by the loop and cannot become engaged with the end portion of the strap handle, nor can the strap handle enter said loop in any manner so as to interfere with the proper functioning and swinging action of the bar 13 in the loop. It will also be seen that by forming the loop 14 from the end portion of the wall 16, said loop is completely free and independent of the side and rear walls of the fastener.

Extending laterally from the side edges of the wall 16 are the side walls 20 and 21, which terminate at their rear edges in the rear plates 22 and 23 respectively. Each of said plates is greater in width than half the width of the wall 16, so that when the plates are bent into their final positions, as shown in Figs. 2 and 5, the free edge portions of said plates overlap each other. The plate 23 extends from its side wall 21 at an obtuse angle but at a lesser angle than that formed by the plate 22 with its side wall 20, whereby in the final positions of the plates, the plate 23 is arranged in front of or inwardly of the plate 22. Along the free edge of the plate 23 are provided the prongs 24 which are formed integrally with said plate 23 and extend at substantially right angles thereto. At the end 25 of the wall 16 remote from the loop 14, are formed the prongs 26 directed rearwardly and adapted to enter the outer face 27 of the strap end portion 11.

To assemble the parts, said portion 11 is first inserted into the compartment 28 formed by the walls 16, 20, 21, the plates 22 and 23 and the loop 14, said strap end portion being moved into said compartment as far as it will go, that is, until it contacts with said loop. That this is done properly can be ascertained by looking through the opening 17. If said opening is covered, the strap end is properly arranged in the compartment 28. But if any part of said opening is exposed, the operator is apprized of the fact that the strap end has not been pushed into the compartment far enough and this can be quickly remedied. The plates 22 and 23 are then bent forwardly quickly and easily as by means of a suitable tool, toward the wall 16 and into their final overlapped positions and into parallel relation with each other and with the wall 16. During the bending operation, the prongs 26 are forced into the end portion of the strap and at the same time the prongs 24 are also forced into the strap end, said prongs serving to prevent retraction of the strap end from the compartment and also to prevent transverse movement of the strap so that said strap end is adequately locked and secured against movement in all directions. The plate 23 is further held in its proper position by the plate 22 due to the overlapping of said plates so that a dependable connection between the bag strap and the link 12 is provided, insuring against accidental separation of the parts even under the severe stresses of use.

It will be seen that by providing a closed loop 14, not only does the loop serve as a stop means for determining the proper position of the strap end in the compartment 28, but possible interference of said strap end with the operation of the link 12 is prevented.

It will further be seen that by providing the pronged plate 23 with prongs 24 aligned at substantially right angles to the alignment of the prings 26, retraction of the strap handle from the fastener is prevented and that by overlapping the plates 22 and 23, opening of the fastener and consequent release of the strap handle under stress is also prevented.

While I have shown and described certain specific embodiments of my invention, I do not wish to be understood as limiting myself thereto, but intend to claim the invention as broadly as may be permitted by the state of the prior art and the scope of the appended claims.

I claim:

1. A one-piece sheet metal connecter for use in hingedly connecting the flat unlooped end of a handle strap to a swivel link comprising a substantially rectangular front portion having an opening therein through which the strap end inserted into the connecter is visible, a series of prongs on one end of said front portion, a completely closed cylindrical loop bent towards said prongs and through an angle of substantially 360° at the other end of said front portion, rearwardly extending sides at the side edges of said front portion, and a pair of rear plates each extending from one of the sides and at an obtuse angle thereto, each of said plates being of a width equal to more than half the width of said front portion, one of said plates having a free edge portion extending past and rearwardly of the corresponding rear edge portion of the other plate, and forwardly-extending prongs on said free edge portion of said other plate, said plates being bendable toward the front plate and into parallel relation thereto and said front portion, loop, sides and plates forming a compartment open at one end only for the reception of the strap end.

2. In a one-piece sheet metal strap handle fastener, a compartment for the reception of the end of a strap handle comprising a flat front wall, a completely cylindrical transverse loop outstanding rearwardly from one end of said wall and forming a closure for one end of said compartment, prongs extending rearwardly from the other end of the wall and forming a partial closure for the other end of the compartment, side walls each extending rearwardly from a side edge of said front wall, and a pair of plates each extending transversely from the rear edge of a side wall and in divergent relation to the front wall, one of said plates being arranged rearwardly of the other, said plates being bendable into parallel relation to the front wall and cooperating with each other to form a closure for the rear of said compartment, said plates being of sufficient width to overlap at their adjacent edge portions when bent into the compartment-closing positions thereof and prongs projecting forwardly of said one of said plates.

DANIEL I. REITER.